United States Patent [19]
DuBois

[11] 4,050,831
[45] Sept. 27, 1977

[54] UNITARY BUSHING AND RETAINER ASSEMBLY

[75] Inventor: Edmund H. DuBois, Zion, Ill.

[73] Assignee: Outboard Marine Corporation, Waukegan, Ill.

[21] Appl. No.: 723,487

[22] Filed: Sept. 15, 1976

[51] Int. Cl.$^2$ .......................... B25G 3/00; F16B 9/00; F16B 13/06

[52] U.S. Cl. ...................................... 403/243; 85/84; 403/119

[58] Field of Search ................... 85/84, 85, 83, 82, 80, 85/7, 5 CP; 151/41.75; 403/119, 165, 361, 263, 243, 372; 24/217 R; 211/96, 100, 168, 171

[56] References Cited

U.S. PATENT DOCUMENTS

| | | | |
|---|---|---|---|
| 2,140,132 | 12/1938 | Hollett | 85/5 CP X |
| 3,042,273 | 7/1962 | Bauer et al. | 403/165 X |
| 3,141,489 | 7/1964 | Rapata | 85/80 |
| 3,164,054 | 1/1965 | Biesecker | 85/84 X |
| 3,415,155 | 12/1968 | Riddell et al. | 85/83 X |
| 3,539,234 | 11/1970 | Rapata | 404/119 X |
| 3,628,816 | 12/1971 | Ross | 403/243 X |

FOREIGN PATENT DOCUMENTS 938,540   10/1963   United Kingdom .............. 151/41.75

*Primary Examiner*—Ramon S. Britts
*Attorney, Agent, or Firm*—Michael, Best & Friedrich

[57] ABSTRACT

Disclosed herein is a unitary bushing and retainer assembly for pivotally connecting a first work piece having a shank portion, such as a connecting rod, with a second work piece having an aperture, such as a lever. The bearing and retainer assembly includes a sleeve portion which fits snugly inside the lever aperture and has a bore for pivotally receiving the shank portion of the connecting rod. After the connection has been completed, withdrawal of the connecting rod from the sleeve portion is prevented by an annular rib which is located on the sleeve portion bore and is received in an annular recess provided in the shank portion of the connecting rod. A pair of opposed arms extending radially from one end of the sleeve portion and having locking elements which snap over the opposite edges of the lever secure the bearing and retainer assembly and the connecting rod on the lever.

7 Claims, 3 Drawing Figures

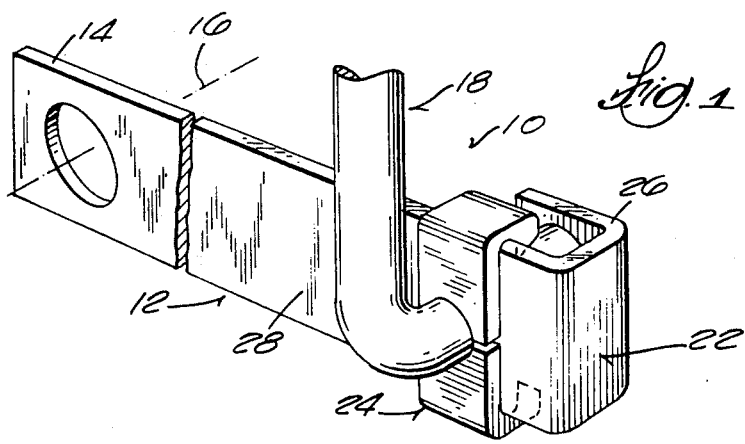
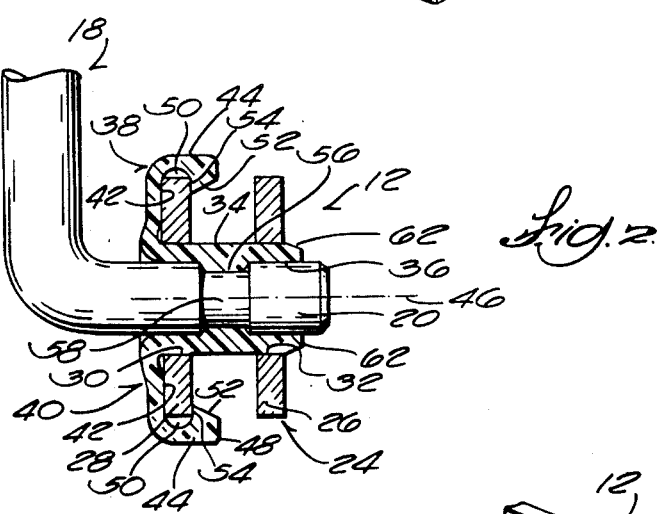
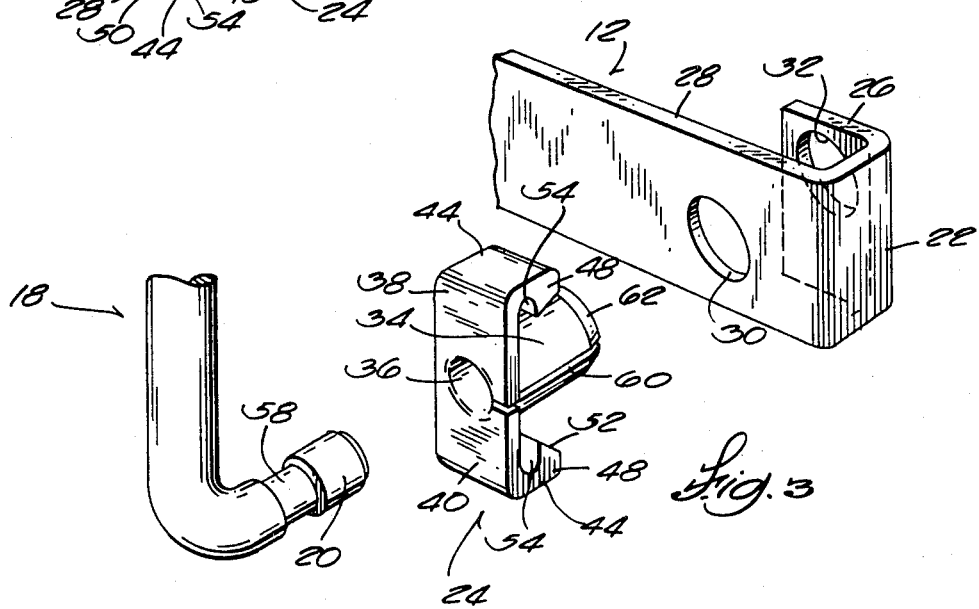

UNITARY BUSHING AND RETAINER ASSEMBLY

BACKGROUND OF THE INVENTION

This invention relates to means for pivotally connecting a first work piece having a stud or shank portion with a second work piece having an aperture.

Control mechanisms and linkage systems, such as carburetor throttle control linkages, commonly employ a connecting rod or similar element having a stud or shank portion which is pivotally connected with a link or lever. Several separate components often are used for such a connection. For example, a bushing is mounted in an aperture at one end of the lever for receiving the shank portion of the connecting rod and the lever is retained on the connecting rod shank portion by a pair of washers located on the opposite sides of the lever and by a pair of cotter pins, spring clips, snap rings, or the like, mounted on the shank portion.

One-piece bushings made from a plastic material and designed to also serve as a retainer have been used for this purpose. Typical prior art constructions for such combined bushing and retainers can require special care during the assembly to insure a proper connection and/or permit some transverse twisting of the link or lever relative to the connecting rod under some conditions. Representative examples of prior art constructions for a one-piece bushing and retainer assemblies are disclosed in the following United States patents:

Biesecker: U.S. Pat. No. 3,164,054 issued Jan. 5, 1965
Ross: U.S. Pat. No. 3,628,816 issued Dec. 21, 1971
Judd: U.S. Pat. No. 3,919,366 issued Nov. 11, 1975

SUMMARY OF THE INVENTION

The invention provides a unitary bushing and retainer assembly for pivotally connecting a first work piece including a shank portion which has a recess with a second work piece having an aperture therethrough. The bushing and retainer assembly includes a sleeve portion for extending through the second work piece aperture and having a bore for pivotally receiving the shank portion of the first work piece, a retainer means on the sleeve portion bore for engaging the recess in the shank portion of the first work piece and thereby resisting withdrawal of the first work piece from the sleeve portion bore, an arm extending radially from one end of the sleeve portion, and means for locking the arm onto the second work piece so as to restrain axial movement of the second work piece relative to the first work piece.

In a preferred embodiment, a pair of generally opposed arms are provided on one end of the sleeve portion and the locking means comprises a locking element extending from the outer end of each of the arms generally parallel to the longitudinal center line of the sleeve portion and having a hook-like portion adapted to snap over the opposite edges of the second work piece in response to axial movement of the sleeve portion into the second work piece aperture.

In a preferred embodiment, the sleeve portion is provided with an axially extending slot which transverses the entire length of the sleeve portion so that the sleeve portion can be spread apart to facilitate installation of the bushing and retainer assembly onto the shank portion of the first work piece.

In one embodiment, the shank portion of the first work piece is provided with an annular recess and the sleeve portion bore is provided with an annular rib which fits into this recess and thereby serves as the means to retain the bushing and retainer assembly on the first work piece.

One of the principal features of the invention is the provision of a unitary bushing and retainer assembly for pivotally connecting a first work piece having a shank portion with a second work piece having an aperture.

Another of the principal features is the provision of such a bushing and retainer assembly which, although simply constructed and easy to install, provides a secure connection between the two work pieces.

Other features and advantages of the embodiments of the invention will become apparent upon reviewing the following detailed description, the drawing and the appended claims.

BRIEF DESCRIPTION OF THE DRAWING

FIG. 1 is a fragmentary, perspective view of a portion of a linkage system incorporating a unitary bushing and retainer assembly embodying various of the features of the invention.

FIG. 2 is a partially sectioned end elevation view of the linkage arrangement shown in FIG. 2.

FIG. 3 is an exploded, fragmentary, perspective view of the various components of the linkage arrangement illustrated in FIG. 1.

Before explaining at least one embodiment of the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

GENERAL DESCRIPTION

Illustrated in the drawing is a portion of a linkage arrangement 10 for controlling the throttling of an internal combustion engine carburetor (not shown). The linkage arrangement 10 includes a lever 12 (shown fragmentarily) which is mounted at one end 14 for pivotal movement about an axis 16 and a connecting rod 18 (shown frgmentarily) including a stud or shank portion 20 which is pivotally connected to the other or free end portion 22 of the lever 12 via a unitary bushing and retainer assembly 24 embodying the invention.

In the specific linkage arrangement illustrated, the connecting rod 18 undergoes translatory movement in response to pivotal movement of the lever 12 about the axis 16. The free end portion 22 of the lever 12 is flattened and includes an ear 26 which is integrally connected to and located in spaced parallel relation to the main body 28 of the lever 12. The free end portion 22 also includes a pair of coaxial, circular apertures 30 and 32 respectively provided in the main body 28 and in the ear 26 for accommodating the bushing and retainer assembly 24.

The bushing and retainer assembly 24 preferably is formed in one piece and molded from a tough, resilient plastic material such as nylon. The bushing and retainer assembly 24 includes a generally cylindrical sleeve portion 34 which is adapted to extend through the lever apertures 30 and 32. The outside diameter of the sleeve portion 34 closely approximates the inside diameter of the lever apertures 30 and 32. The sleeve portion 34 has a central, generally cylindrical bore 36 extending axially therethrough. The bore 36 has an inside diameter substantially equal to the outside diameter of the connecting rod shank portion 20.

The bushing and retainer assembly 24 also includes a pair of diametrically opposed, generally rectangular arms 38 and 40 which extend radially outwardly from one end of the sleeve portion 34 and are adapted to lock the assembly 24 onto the lever 12.

More specifically, each of the arms 38 and 40 includes an inner face portion 42 which abuts one side of the main body 28 of the lever 20 in the vicinity of the aperture 30 when the bushing and retainer assembly 24 is assembled with the lever 12 and the connecting rod 18. In addition, respective locking elements 44 extend from the outer end of each of the arms 38 and 40 in generally parallel relation to the longitudinal center line 46 of the sleeve portion 34 (FIG. 2). Each of the locking elements 44 has a hook-like portion 48 which, in response to axial movement of the sleeve portion 34 into the lever apertures 30 and 32 (i.e., movement of the sleeve portion to the right as viewed in FIG. 2), is arranged to snap over an edge of the main body 28 of the lever 12 and to thereafter positively restrain axial movement of the bushing and retainer assembly 24 relative to the lever 12. In other words, the arms 38 and 40 and their associated locking elements 44 embrace the main body 28 of the lever 12.

Each locking element 44 has a recess 50 for receiving an edge of the lever 12 and a tapered or inwardly inclined surface 52. During installation of the retainer and bushing assembly 24 onto the lever, the surface 52 engages an outer edge of the lever 12 and acts as a camming surface for deflecting the locking element 44 radially outwardly to obtain the desired snap-on mounting. The lateral spacing between the inner wall 54 of each of the hook-like portions 48 and the inner face 42 of the arms is approximately the same as the thickness of the main body 28 of the lever 12 in the vicinity of the aperture 30 so as to minimize axial movement of the lever 12 relative to the connecting rod shank portion 20 after assembly.

The sleeve portion bore 36 preferably includes an annular rib 56 which extends radially inwardly from the wall of the bore 36 and is snugly received in an annular groove 58 provided in the connecting rod shank portion 20. The rib 56 engages the groove 58 to positively restrain withdrawal of the connecting rod shank portion 20 from the sleeve portion 34 and yet permit free pivotal movement of the connecting rod shank portion 20 relative to the sleeve portion 34.

To facilitate installation of the bushing and retainer assembly 12 on the connecting rod shank portion 20, an axially extending slot 60 is provided along one side of the assembly. As shown in FIG. 3, the slot 60 extends radially completely through one wall of the sleeve portion 34 and transverses the entire length of the assembly to divide the arms 38 and 40 at one side. Thus, the slot 60 permits the sleeve portion 34 to be spread apart to facilitate installation of the rib 56 into the groove 58.

The bushing and retainer assembly 24 can be installed onto the connecting rod shank portion 20 by slipping it over the outer end of the connecting rod shank portion 20 in an axial direction or spreading the sleeve portion 34 apart and pressing the assembly onto the shank portion 20 from the side when the rib 56 aligned with the groove 58. After the bushing and retainer assembly 24 has been installed on the connecting rod shank portion 20, the connection is completed by pushing the sleeve portion 34 through the lever apertures 30 and 32 until the locking elements 44 have snapped into place over the opposite edges of the amin body 28 of the lever 12. The entry end 62 of the sleeve portion 34 preferably is tapered to facilitate entry into the lever apertures 30 and 32.

Since the outer diameter of the sleeve portion 34 is substantially the same as the inside diameter of the lever apertures 30 and 32, the sleeve portion 34 cannot spread apart after assembly and the rib 56 restrains withdrawal of the connecting rod shank portion 20 from the sleeve portion bore 36.

As discussed above, the bushing and retainer assembly 24 is locked onto the lever by the arms 38 and 40 and the locking element 44. Thus, while the bearing and retainer assembly 24 is a one-piece unit of simple construction, it permits quick and easy pivotal connection of two work pieces, even in areas where connections with prior art construction is highly difficult, and provides a positive connection which will not loosen under normal circumstances.

In the event disassembly of the two work pieces is desired for some reason, this can be accomplished by simply deflecting the locking elements 44, i.e., bending them back, away from the edges of the lever 12 so that the assembly 24 and connecting rod shank portion 20 can be removed from the lever apertures 30 and 32. The bushing and retainer assembly 24 can be removed from the connecting rod shank portion 20 by spreading the sleeve portion 34 far enough apart to free the rib 56 from the groove 58.

Various features of the invention are set forth in the following claims:

What is claimed is:

1. A unitary bushing and retainer assembly comprising a first work piece including a shank portion which has a recess, a second work piece including a main body and an ear which is integrally connected to said main body in generally spaced parallel relation to said main body, said main body and ear having therein respective coaxial apertures, and a unitary bushing and retainer comprising a sleeve portion extending through both of said second work piece apertures and including a bore extending coaxially with said apertures and pivotally receiving said shank portion of said first work piece, retainer means located between said apertures of said second work piece, on said sleeve portion bore and engaging said recess in said shank portion of said first work piece, thereby positively resisting withdrawal of said shank portion from said bore, and means for preventing movement of said second work piece axially of said shank portion of said unitary bushing and retainer.

2. A unitary bushing and retainer assembly according to claim 1 wherein said means preventing movement of said second work piece axially of said shank portion of said unitary bushing and retainer comprises a pair of arms which extend radially from one end portion of said sleeve portion in generally opposite directions and which have respective outer end portions and respective locking elements extending from said outer end portions in generally parallel relation to the longitudinal center line of said sleeve portion and respectively including hook-like portions, said hook-like portions being adapted to snap over said second work piece in response to axial movement of said sleeve portion into said apertures of said second work piece.

3. A unitary bushing and retainer assembly according to claim 2 wherein said sleeve portion has an axially extending slot which transverses the entire length of said sleeve portion including said one end portion so that said sleeve portion can be spread apart to facilitate installation of said unitary bushing and retainer onto the shank portion of the first work piece.

4. A unitary bushing and retainer assembly according to claim 2 wherein the shank portion of the first work piece is provided with an annular recess, and wherein said retainer means comprises a radially inwardly extending annular rib on said sleeve portion bore and adapted to fit snugly into the recess in the shank portion of the first work piece.

5. A unitary bushing and retainer assembly according to claim 2 wherein each of said locking elements includes a recessed area for receiving an outer edge portion of said second work piece, and wherein each of said hook-like portions includes an inwardly inclined surface which is adapted to engage the associated outer edge portion of said second work piece and to cooperate therewith, in response to axial movement of said sleeve portion into said apertures of said second work piece, to cam the respective locking elements radially outwardly so as to permit entry of the outer edge portions of said second work piece into said recessed areas.

6. An assemblage comprising a rod-like element including a shank portion having an annular recess, a member having a main body and an ear which is integrally connected to said main body in generally spaced parallel relation thereto, said main body and said ear having respective coaxial apertures, and a unitary bushing and retainer assembly pivotally connecting said element with said member and including a sleeve portion extending in said apertures of said member and having a central bore receiving said element shank portion so as to afford pivotal movement therebetween, said sleeve portion bore having an annular rib located between said main body and said ear and fitting into said shank portion recess to positively resist withdrawal of said shank portion from said sleeve portion bore, an arm extending radially from one end portion of said sleeve portion, and means for locking said arm onto said member to restrain relative axial movement of said member and said element.

7. An assemblage according to claim 6 wherein said bushing and retainer assembly includes a pair of said arms extending from said sleeve portion in generally opposite directions, each of said arms having an outer end and an inner face portion abutting one side of said member, and further includes a locking element extending from the outer end of each of said arms in generally parallel relation to the longitudinal center line of said sleeve portion, each of said locking elements including a hook-like portion having an inner wall engaging the opposite side of said member and cooperating with respective of said arm inner wall portions to lock said arms on said member and thereby restrain relative axial movement of said member and said element.

* * * * *